Patented Apr. 9, 1940

2,196,768

UNITED STATES PATENT OFFICE 2,196,768

ENTERIC COATING

Gordon D. Hiatt, Rochester, N. Y., assignor to Eastman Kodak Company, Rochester, N. Y., a corporation of New Jersey No Drawing. Application March 11, 1938, Serial No. 195,343

10 Claims. (Cl. 167—82)

This invention relates to medicaments, coated or surrounded with an enteric coating i. e., a layer or film which is substantially soluble in, or disintegrated by the intestinal secretions but substantially insoluble in the secretions of the stomach.

Numerous substances have been proposed for use as enteric coatings. Many of them are rather difficult to prepare and, furthermore, do not have the resistance to disintegration as well as penetration by the stomach secretions which is necessary if they are to serve the purpose for which they are intended. Others, while unaffected by the stomach secretions are likewise unaffected or very slowly affected by the intestinal secretions so that the contained medicament is not released. Cellulose derivatives, such as cellulose nitrate and acetate, either alone or mixed with other substances, such as waxes, have been proposed but are subject to one or more of the above deficiencies.

This invention has for its object to provide an enteric coating free of the above difficulties. Another object is to provide an improved enteric coating. A further object is to provide a coating for medicaments, powders, pills, tablets, and the like, which coating is substantially unaffected by the stomach secretions, but is disintegrated or dissolved by the intestinal secretions. A still further object is to provide an improved enteric coating comprising cellulose derivatives. Other objects will appear hereinafter.

I have discovered that compositions which include derivatives of cellulose which contain free carboxyl groups are effective and satisfactory enteric coatings.

The cellulose derivatives containing free carboxyl groups can be prepared using any one of several methods of preparation known in the art. Such esters are not new, but have been prepared only in recent years. A method which is of general application is disclosed in the Malm and Waring applications, Serial No. 380,252, filed July 22, 1929 (Patent 2,093,462, September 21, 1937) and Serial No. 627,150 filed July 30, 1932 (Patent 2,093,464, September 21, 1937). This procedure involves reacting cellulose or a cellulose derivative containing free and available hydroxyl groups with a polycarboxylic acylating agent, specifically an anhydride of the polycarboxylic acid, while in the presence of a tertiary organic base. Another suitable method involves reaction of the polycarboxylic acid anhydride with the cellulose or cellulose derivative containing free hydroxyl in the presence of a solvent. This procedure avoids the necessity of using an organic base and is disclosed in application, Serial No. 52,874, filed December 4, 1935 (Patent 2,126,460, August 9, 1938) in the name of L. B. Genung. The amount of carboxyl introduced may be controlled by the amount of anhydride or the amount of free hydroxyl present.

The ester compositions found to be useful can be simple esters of the polycarboxylic acid or may be a mixed ester or mixed ether-esters. Mixed esters or ethers are most generally useful. In preparing the simple ester, cellulose or regenerated cellulose is reacted with the polycarboxylic anhydride. To obtain a mixed ester a partially esterfied ester, such as cellulose acetate containing free and available hydroxyl is reacted with the anhydride of the polycarboxylic acid. The mixed ether-polycarboxylic esters etc. are prepared in the same way.

Examples of polycarboxylic acid anhydrides which may be reacted with the cellulose or its derivatives are phthalic, succinic, diglycollic and maleic anhydrides or equivalent acylating agents. Examples of cellulose derivatives which may be reacted with these acylating agents instead of free cellulose are cellulose acetate, propionate, butyrate, acetate-propionate, acetate-butyrate, and cellulose ethers, such as ethyl, butyl, benzyl, etc., all of which contain free and available hydroxyl groups in the cellulose molecule.

The composition of the ester can be varied greatly to give enteric coatings having particular properties as regards resistance to the stomach secretions and rate of dissolution or disintegration in the intestinal secretions. For instance it has been found that an increase in the amount of inert ester or ether (acetyl, ethyl, etc.) content of the molecule results in increased resistance to the action of water, acid or alkali. The solubility in alkali increases with increase in the free carboxyl content. The rate of dissolution can likewise be controlled by varying the thickness of the coating. For most enteric coatings esters having a free carboxyl (COOH) content of between about 5 and 25 percent and particularly between 9 and 15 percent by weight will be found to be most generally preferable. However, it is to be understood that these proportions are given as examples of the preferred compositions and that my invention is not limited thereto. Thin dopes such as 50-400 centipoises are in general best with the lower ranges of free carboxyl content while thicker dopes such as for instance 400–25,000 centipoises are advantageous with the higher carboxyl content.

The substance to be coated, such as powders or pills can be directly dipped into a solution of these esters dissolved in a suitable solvent. It may however be preferable that the medicament, powder, or pill, first be coated with, or enclosed in gelatine and then be dipped, spread or otherwise coated with the solution of the cellulose derivative. The thickness of the coating can be controlled by varying the concentration of the solution of the ester in the solvent. A plurality of immersions to form a plurality of layers or coatings can also be used. If desired, the esters may be formed into capsules composed of separate telescoping units into which the medicament can be placed and sealed therein with a dope of the ester applied at the edge of the telescoping segments.

The following examples illustrate methods for preparing suitable cellulose derivatives and coating dopes:

Example I

Dissolve 200 g. of phthalic anhydride in 400 g. of pyridine, add 100 g. of cellulose acetate containing 33 percent acetyl and heat on a steam bath for 14 to 18 hours. The reaction mixture is diluted with acetone and precipitated by pouring into 5% hydrochloric acid and is then washed and dried. The product contains 32 percent phthalyl. A dope suitable for coating medicaments is prepared by dissolving 15 g. of this product in a mixture of 40 g. ethylene dichloride and 10 g. of methyl alcohol.

Example II 10 g. of cellulose (cotton linters) was treated with a mixture of 50 g. of phthalic anhydride and 200 g. of pyridine. This mixture was heated at 60°–70° C. for two weeks. It was then diluted with water, precipitated in dilute hydrochloric acid and washed and dried. The product contains 50 percent phthalyl. A dope suitable for enteric coatings is prepared by dissolving 5 g. of this product in a mixture of 15 g. of ethyl lactate, 9 g. of water and 11 g. of ethyl alcohol.

Example III 10 g. of cellulose was heated with a mixture of 25 g. of succinic anhydride and 75 cc. of pyridine at 60°–70° C. for one week. The product was diluted, precipitated, washed and dried in the usual manner. It contained 62 percent succinyl. A coating dope is prepared by dissolving 5 g. of the product in 40 g. of dioxan.

Example IV

A mixture of 100 g. of cyclohexanone, 50 g. succinic anhydride and 25 g. of cellulose acetate which had been hydrolyzed to approximately 33.5 percent acetyl content was heated at 60–70° C. for 3 days. The product when precipitated and washed contained 26.5 percent succinyl. An enteric coating dope is prepared by dissolving 5 g. in 40 g. of dioxan.

Example V

A mixture of 6 lbs. of ethyl cellulose (containing 41.6 percent ethoxyl), 10 lbs. of phthalic anhydride and 36 lbs. of pyridine was heated for 5.5 hours at 95° C. The mixture was acidified with acetic acid and precipitated in water. The ether-ester product analyzes 27.6 percent phthalyl. A suitable coating dope is made by dissolving 5 g. of this product in 30 g. of a mixture of 4 parts ethylene dichloride and 1 part methyl alcohol.

The following examples indicate suitable testing methods and the effect of the coating thickness and how it can be varied to suit requirements. The tests used in each of the examples were designed to simulate the conditions of the human body as closely as possible. The acid concentration used was .55% hydrochloric acid. The alkaline solution was .25% sodium bicarbonate and the temperature of the tests was 37° C. The capsules coated with the improved enteric coating contained a methyl orange indicator and were immersed in the acid or alkaline solution. The time at which the indicator was affected, was the period of time required for penetration of the coating.

Example VI

A cellulose phthalate containing 64% phthalyl was made into dopes at 8:1 and 4:1 solvent: solid ratios. Gelatin capsules containing methyl orange were coated with the dopes by a dipping operation and subsequently dried. The 4:1 coating withstands the acid treatment for 4–5 hours but is attacked by the alkaline solution in 15–20 minutes. The thinner coat resists acid for 1.5–6 hours but it is penetrated in the bicarbonate solution in 5–7 minutes.

Example VII

A cellulose acetate-phthalate prepared from cellulose acetate containing 33 percent acetyl and containing 35% phthalyl was made into 6:1 and 3:1 dopes. These coatings are stable to acid for 4–5 hours. The heavier layer is penetrated by alkali in 20–90 minutes, the lighter in 15–30 minutes.

Example VIII

A cellulose acetate-phthalate prepared from a cellulose acetate containing 38.7 percent acetyl and containing 22% phthalyl was treated as in Example VII. The 3:1 coating was slowly attacked by acid in 24 hours, by alkali in 0.5–4 hours. The 6:1 dope coating is affected by acid in 2–6 hours and by alkali in 10 minutes to 2 hours.

It may be desirable to plasticize the cellulose derivatives. This will result in a coating which is less brittle and, therefore, less liable to crack. The use of plasticizers when relatively large pliable capsules are to be coated is advantageous. Suitable plasticizers are triacetin or tripropionin. Plasticizers having properties similar to the cellulose ester such as ethyl acid phthalate, butyl acid phthalate and ethyl acid adipate would be preferable. Other materials which are relatively insoluble in the stomach secretions, such as fats and waxes, may likewise be mixed with the esters, if desired.

I claim:

1. As a new article of manufacture a medicament surrounded by an enteric film or layer of a derivative of cellulose which contains free carboxyl groups, and which is substantially insoluble in acid stomach secretions and soluble in alkaline intestinal fluids.

2. As a new article of manufacture a medicinal gelatine capsule externally coated with an enteric coating comprising a cellulose derivative containing free carboxyl groups, which is substantially insoluble in acid stomach secretions and soluble in alkaline intestinal fluids.

3. As a new article of manufacture a medicament surrounded by an enteric film or layer of a polycarboxylic acid ester of cellulose which contains free carboxyl groups, and which is substantially insoluble in acid stomach secretions and soluble in alkaline intestinal fluids.

4. As a new article of manufacture a medicament surrounded by an enteric film or layer of a derivative of cellulose which contains between 5 and 25 percent free carboxyl by weight, and which is substantially insoluble in acid stomach secretions and soluble in alkaline intestinal fluids.

5. As a new article of manufacture a medicament surrounded by an enteric film or layer of a cellulose derivative which contains a dicarboxylic acid radicle and which contains free carboxyl groups.

6. As a new article of manufacture a medicament surrounded by an enteric film or layer of a cellulose ester which contains a dicarboxylic acid radicle and which contains between 5 and 25 percent free carboxyl by weight.

7. As a new article of manufacture a medicament surrounded by an enteric film or layer of a mixed ester of cellulose which contains a dicarboxylic acid radicle and which contains between 5 and 25 percent free carboxyl by weight.

8. As a new article of manufacture a medicament surrounded by an enteric film or layer of a mixed ester of cellulose containing dicarboxylic and mono-basic fatty acid radicles and containing free carboxyl groups.

9. As a new article of manufacture a medicament surrounded by an enteric film or layer of a cellulose ester containing phthalyl groups and containing free carboxyl groups.

10. As a new article of manufacture a medicament enclosed within a gelatine capsule which is externally coated with an enteric layer or film of a cellulose acetate-phthalate which contains between 9 and 15 percent free carboxyl by weight.

GORDON D. HIATT.